US012315481B2

(12) United States Patent
Fukushima et al.

(10) Patent No.: US 12,315,481 B2
(45) Date of Patent: May 27, 2025

(54) KEYBOARD INSTRUMENT

(71) Applicant: CASIO COMPUTER CO., LTD., Tokyo (JP)

(72) Inventors: Shingo Fukushima, Oume (JP); Kouji Oshima, Fussa (JP); Naoto Imamura, Akishima (JP); Yuuki Nakajima, Tachikawa (JP); Mari Nakajima, Hino (JP); Ryohei Kobayashi, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 707 days.

(21) Appl. No.: 17/480,164

(22) Filed: Sep. 21, 2021

(65) Prior Publication Data

US 2022/0093069 A1 Mar. 24, 2022

(30) Foreign Application Priority Data

Sep. 23, 2020 (JP) ................................ 2020-158598

(51) Int. Cl.
*G10H 1/34* (2006.01)
*G10G 7/00* (2006.01)
*G10H 1/00* (2006.01)

(52) U.S. Cl.
CPC ................. *G10H 1/34* (2013.01); *G10G 7/00* (2013.01); *G10H 1/0008* (2013.01); *G10H 2220/221* (2013.01)

(58) Field of Classification Search
CPC .. G10H 1/34; G10H 1/0008; G10H 2220/221; G10G 7/00
USPC ............................................................ 84/644
See application file for complete search history.

(56) References Cited

U.S. PATENT DOCUMENTS

2007/0012162 A1* 1/2007 Saito ........................ G10C 3/12 84/478
2022/0093069 A1* 3/2022 Fukushima .......... G10H 1/0008
2022/0130352 A1* 4/2022 Hoshino .................. G10C 3/02
2023/0404255 A1* 12/2023 Sakai ....................... G10G 5/00

FOREIGN PATENT DOCUMENTS

BR 112021002733 B1 * 5/2022 ........... A47B 23/004
JP H0444694 U * 4/1992
JP 2570940 B2 * 1/1997
JP 3047286 U * 4/1998
JP 2001092458 A * 4/2001
JP 2001242868 A * 9/2001
JP 2003248477 A * 9/2003
JP 2006251716 A * 9/2006 ............... G10C 3/00
JP 2006308609 A * 11/2006
JP 2007199185 A * 8/2007
(Continued)

OTHER PUBLICATIONS

Indian First Examination Report dated Nov. 23, 2022, issued in counterpart Indian Application No. 202114040776.

*Primary Examiner* — Christina M Schreiber
(74) *Attorney, Agent, or Firm* — Holtz, Holtz & Volek PC

(57) ABSTRACT

A keyboard instrument includes: a case (upper case) including a back surface member having an insertion port into which a music stand is inserted, and an upper surface member having a recessed portion provided corresponding to the insertion port; and an exterior member that is disposed on an upper side of the upper surface member and covers the recessed portion.

10 Claims, 6 Drawing Sheets

(56) References Cited

FOREIGN PATENT DOCUMENTS

| | | | | | |
|---|---|---|---|---|---|
| JP | 4075902 | B2 | * | 4/2008 | |
| JP | 4121394 | B2 | * | 7/2008 | |
| JP | 4318269 | B2 | * | 8/2009 | |
| JP | 2020101633 | A | * | 7/2020 | ............... G10C 3/00 |
| JP | 2024000044 | A | * | 1/2024 | ........... A47B 23/004 |

* cited by examiner

KEYBOARD INSTRUMENT

CROSS-REFERENCE TO RELATED APPLICATION

This application is based upon and claims the benefit of priority from Japanese Patent Application No. 2020-158598, filed on Sep. 23, 2020 in Japan, the entire contents of which are incorporated herein by reference.

BACKGROUND

Technical Field

The present invention relates to a keyboard instrument.

Related Art

Conventionally, a keyboard instrument formed so that a music stand is attachable has been disclosed. For example, in a keyboard instrument disclosed in JP 2006-251716 A, insertion ports into which insertion portions of a music stand are inserted are provided on an upper surface member of a case of the keyboard instrument.

SUMMARY

When the insertion ports into which the music stand is inserted are provided on the upper surface of the case, the design may be impaired, or arrangement of a console unit, speakers, and the like may be restricted.

A keyboard instrument according to the present invention includes: a case including a back surface member having an insertion port into which a music stand is inserted, and an upper surface member having a recessed portion provided corresponding to the insertion port; and an exterior member that is disposed on an upper side of the upper surface member and covers the recessed portion.

According to the present invention, it is possible to provide a keyboard instrument including, in a back surface member, an insertion port for a music stand which favorably supports the music stand.

BRIEF DESCRIPTION OF DRAWING

FIGS. 4A and 4B are views illustrating a main part of an upper case of the keyboard instrument according to the embodiment of the present invention, in which FIG. 4A is a perspective view in which a recessed portion is viewed from a P1 direction of FIG. 3, and FIG. 4B is a perspective view in which the recessed portion and a back surface member are viewed from a P2 direction of FIG. 3;

DETAILED DESCRIPTION

Figure 1:
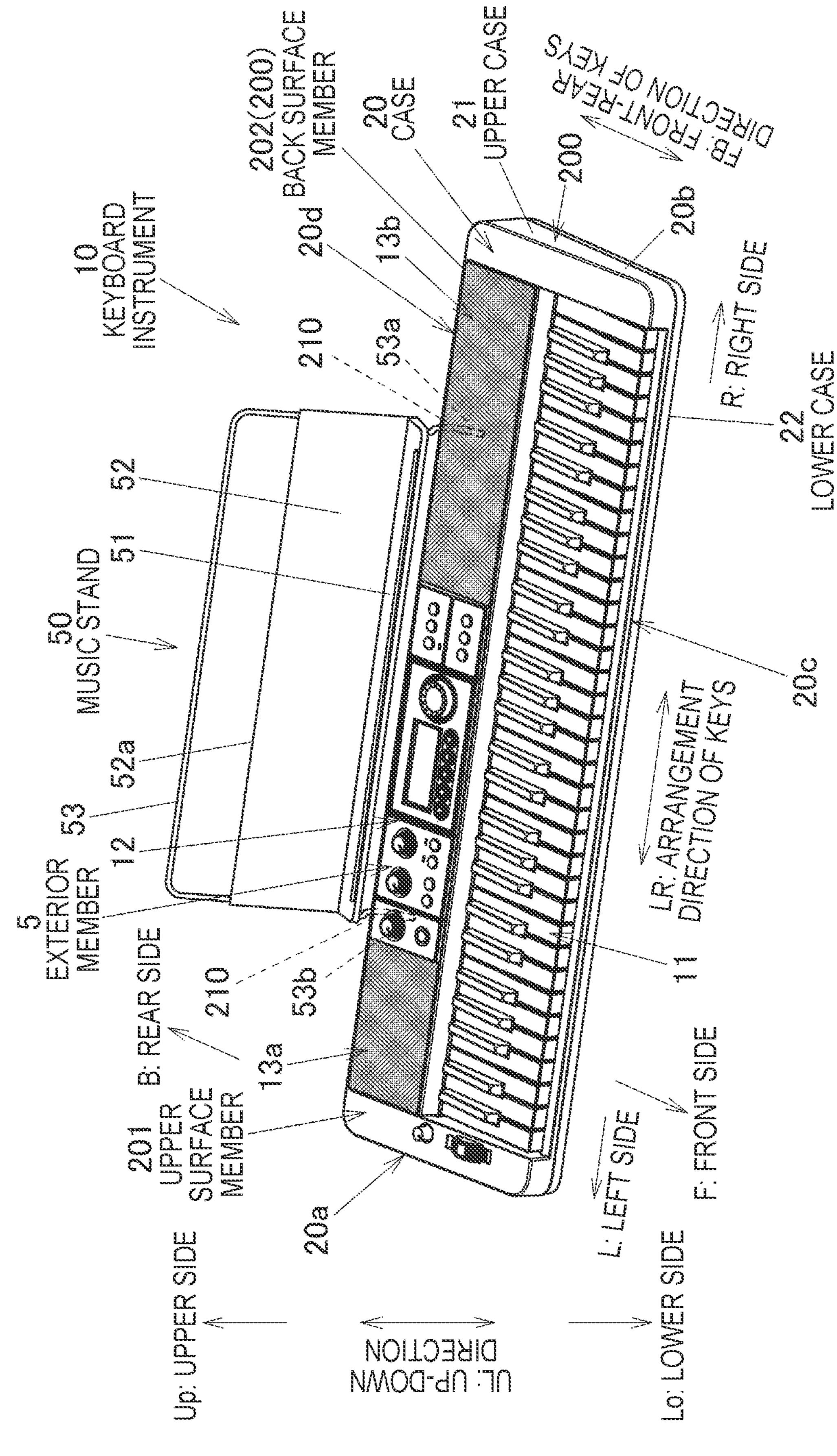
FIG. 1 is a perspective view of a keyboard instrument according to an embodiment of the present invention.

Hereinafter, an embodiment of the present invention will be described with reference to the drawings. A keyboard instrument 10 illustrated in FIG. 1 includes a 61 key keyboard 11 and a case 20. In the following description, a front side in a front-rear direction FB of keys of the keyboard 11 is referred to as a front side F, a rear side in the front-rear direction FB of the keys is referred to as a rear side B, a left side facing the keyboard 11 is referred to as a left side L, and a right side facing the keyboard 11 is referred to as a right side R. An arrangement direction LR of the keys of the keyboard 11 is a left-right direction. In addition, in an up-down direction UL of the keyboard instrument 10, an upper side is defined as an upper side Up, and a lower side is defined as a lower side Lo.

The case 20 has a substantially long rectangular plate shape whose longitudinal direction is the left-right direction, and is divided into an upper case 21 and a lower case 22. The upper case 21 and the lower case 22 are connected by a plurality of bolts (not illustrated). A substrate, a battery which is a power supply and the like are housed inside the case 20. The case 20 includes an outer peripheral plate 200 having an outer peripheral surface (left side surface 20*a*, right side surface 20*b*, front surface 20*c*, and rear surface 20*d*). The upper case 21 includes an upper surface member 201 which is a top plate, and a back surface member 202 which is the outer peripheral plate 200 on the rear side B.

Figure 2:
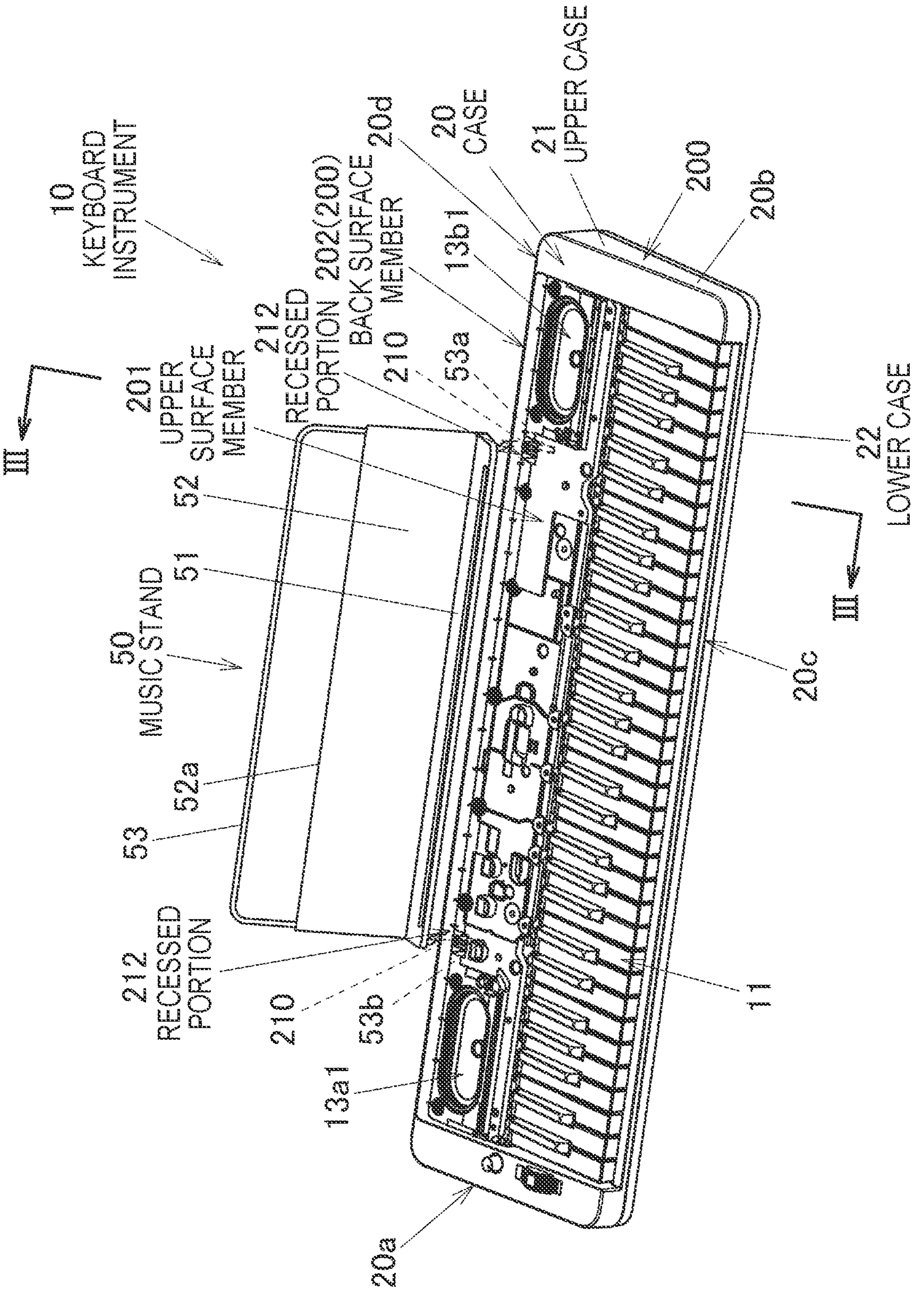
FIG. 2 is a perspective view illustrating a state in which an exterior member of the keyboard instrument according to the embodiment of the present invention is removed.

In the keyboard instrument 10, an exterior member 5 is provided on the rear upper surface of the case 20 which is the rear side B of the keyboard 11. The exterior member 5 includes at least a console unit 12 that receives various input operations, and sound emission units 13*a* and 13*b*. The console unit 12 is provided in a substantially central portion of the rear upper surface of the case 20. The sound emission units 13*a* and 13*b* are provided on the left side and the right side of the console unit 12, respectively. The sound emission units 13*a* and 13*b* have a plurality of holes (not illustrated) formed in the upper surface of the case 20. As illustrated in FIG. 2, speakers 13*a*1 and 13*b*1 are provided inside the case 20 correspondingly to the holes. Cloths are attached to the sound emission units 13*a* and 13*b*.

As illustrated in FIGS. 1 and 2, a music stand 50 is attached to the keyboard instrument 10. The music stand 50 has a substantially long rectangular shape that is long in the arrangement direction LR of the keys. The music stand 50 includes a horizontal plate 51 and a back plate 52. The horizontal plate 51 is provided in an elongated shape in the left-right direction (arrangement direction LR of the keys) with the flat portion facing the up-down direction UL. The back plate 52 extends to substantially the upper side Up from the horizontal plate 51, and has the same left-right width as the horizontal plate 51. The horizontal plate 51 and the back plate 52 are attached to a frame 53 having a substantially frame shape. An upper end edge 52*a* of the back plate 52 and the frame 53 are separated from each other. The frame 53 has an open end, and end portions at the open end are insertion portions 53*a* and 53*b*. The insertion portions 53*a* and 53*b* are inserted into holding portions 210 in recessed portions 212 illustrated in FIG. 2. The insertion portions 53*a* and 53*b* are provided so as to protrude downward.

Next, the recessed portion 212 and its related portions will be described in detail with reference to FIGS. 3 to 6. Since the left and right recessed portions 212 and their related portions have the same structure, the recessed portion 212 corresponding to the right insertion portion 53*a* and its related portions will be described in the following description with reference to FIGS. 3 to 6. In addition, FIGS. 3 to 6 illustrate the music stand 50 and a main part of the case 20 (upper case 21 and lower case 22), and the internal structures other than the main portions of the case 20, such as the console unit 12 and the sound emission units 13*a* and 13*b*, are omitted.

The upper surface member 201 illustrated in FIGS. 3 to 6 is a portion located on the lower side Lo of the console unit 12 and the sound emission units 13*a* and 13*b*. The recessed portion 212 is provided in the upper surface member 201 at a portion corresponding to the holding portion 210 (insertion port 211). The recessed portion 212 has a substantially quadrangular frustum shape and has a substantially square shape in plan view. The length of the recessed portion 212 having a substantially quadrangular frustum shape in the up-down direction is larger on the front side F in the front-rear direction FB of the keys than on the rear side B. The length of the recessed portion 212 in the arrangement direction LR of the keys is larger than the length of the insertion port 211 described later in the arrangement direction LR of the keys. The holding portion 210 having a substantially cylindrical shape is provided in the recessed portion 212. On the front side F of the recessed portion 212, a first connecting portion 213 is extended in the up-down direction UL so as to connect the upper surface member 201 and the holding portion 210. The first connecting portion 213 is formed in a plate shape, is perpendicular to the upper surface member 201, and is provided substantially parallel to the back surface member 202 of the upper case 21 which is the outer peripheral plate 200 on the rear side.

The holding portion 210 includes an insertion port 211, a cylindrical portion 210*a*, and a bottom portion 210*b* to have a substantially bottomed cylindrical shape. The insertion port 211 into which the insertion portion 53*a* of the music stand 50 is inserted opens to the upper case 21 on the rear surface 20*d* of the case 20 (the outer peripheral plate 200 on the rear side B of the case 20). In other words, the back surface member 202 has the insertion port 211. The cylindrical portion 210*a* of the holding portion 210 is provided so as to be inclined downward from the rear side B toward the front side F. In the present embodiment, the holding portion 210 is provided so as to be inclined downward by about 40 degrees from the horizontal plane. An end portion of the insertion portion 53*a* (53*b*) abuts on the bottom portion 210*b* when the insertion portion 53*a* (53*b*) is inserted.

Three first ribs 214 as reinforcing members extending in the front-rear direction FB are provided inside the recessed portion 212. Each of the first ribs 214 connects the surface of the rear side B of the first connecting portion 213, the upper side Up of the cylindrical portion 210*a* of the holding portion 210, and the surface on the front side F of the back surface member 202. Each of the first ribs 214 has a substantially trapezoidal shape in the side view of FIG. 3. A connecting portion 214*a* between each of the first ribs 214 and the first connecting portion 213 and a connecting portion 214*b* between each of the first ribs 214 and the back surface member 202 are each connected in a concave curved shape, and stress concentration is avoided. In particular, the radius of the connecting portion 214*a* with the first connecting portion 213 is set to be larger than the radius of the connecting portion 214*b* with the back surface member 202.

Three second ribs 215 extending in the front-rear direction FB are provided on the lower side Lo of the upper surface member 201 on the front side F of the first connecting portion 213. In other words, the case 20 (upper case 21) includes the second ribs 215 connected to the recessed portion 212 on the outside and the front side F of the recessed portion 212. The three second ribs 215 are disposed at the same positions in the left-right direction as the three first ribs 214. Each of the second ribs 215 connects the surface of the front side F of the first connecting portion 213 and the surface of the lower side Lo of the upper surface member 201. Each of the second ribs 215 has a substantially triangular shape in the side view of FIG. 3. The top side of the lower side Lo of each of the second ribs 215 is extended and connected to the bottom portion 210*b* of the holding portion 210.

Figure 3:
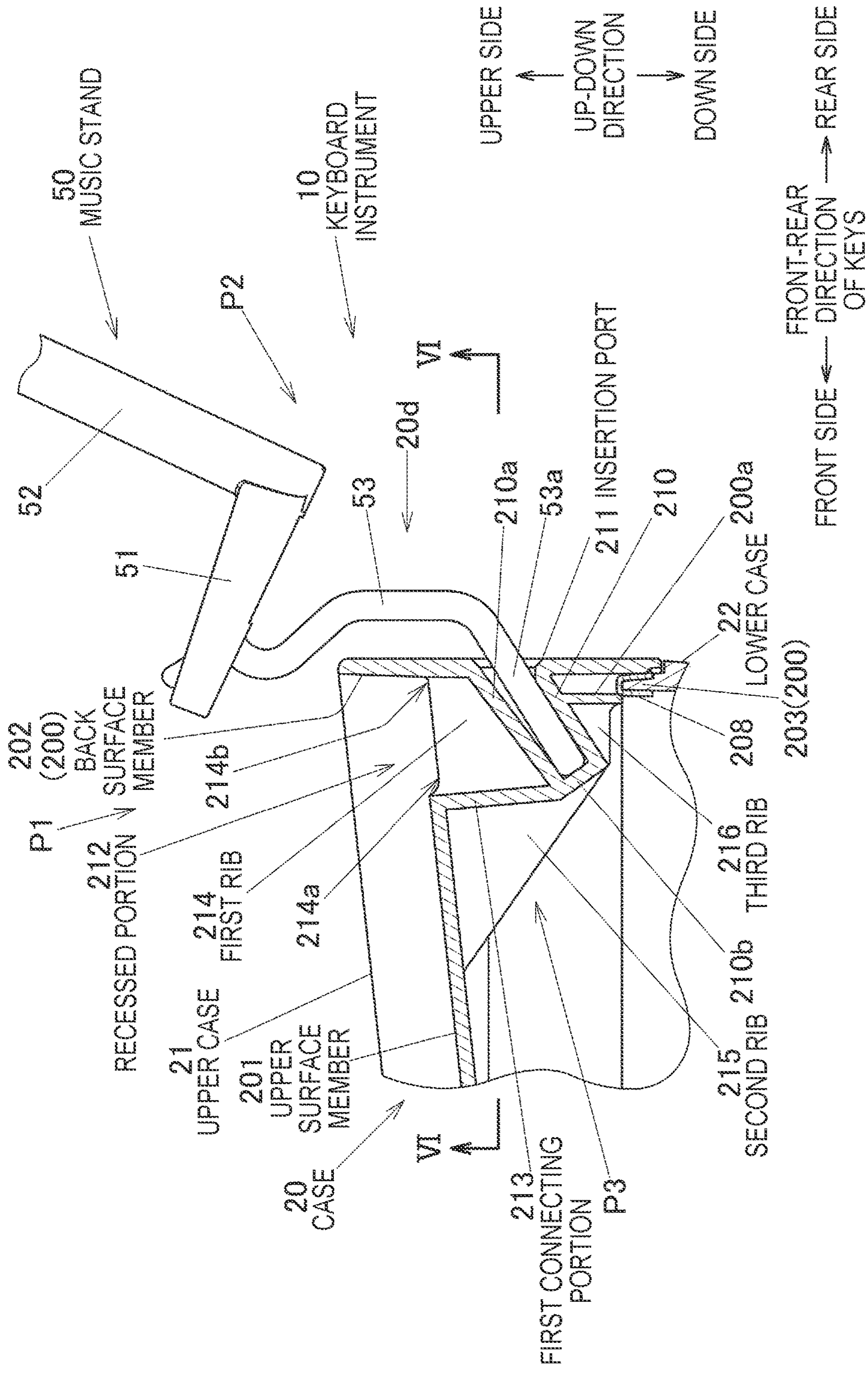
FIG. 3 is a cross-sectional view schematically illustrating a III-III cross section in FIG. 2 of the keyboard instrument according to the embodiment of the present invention.
Figure 5:
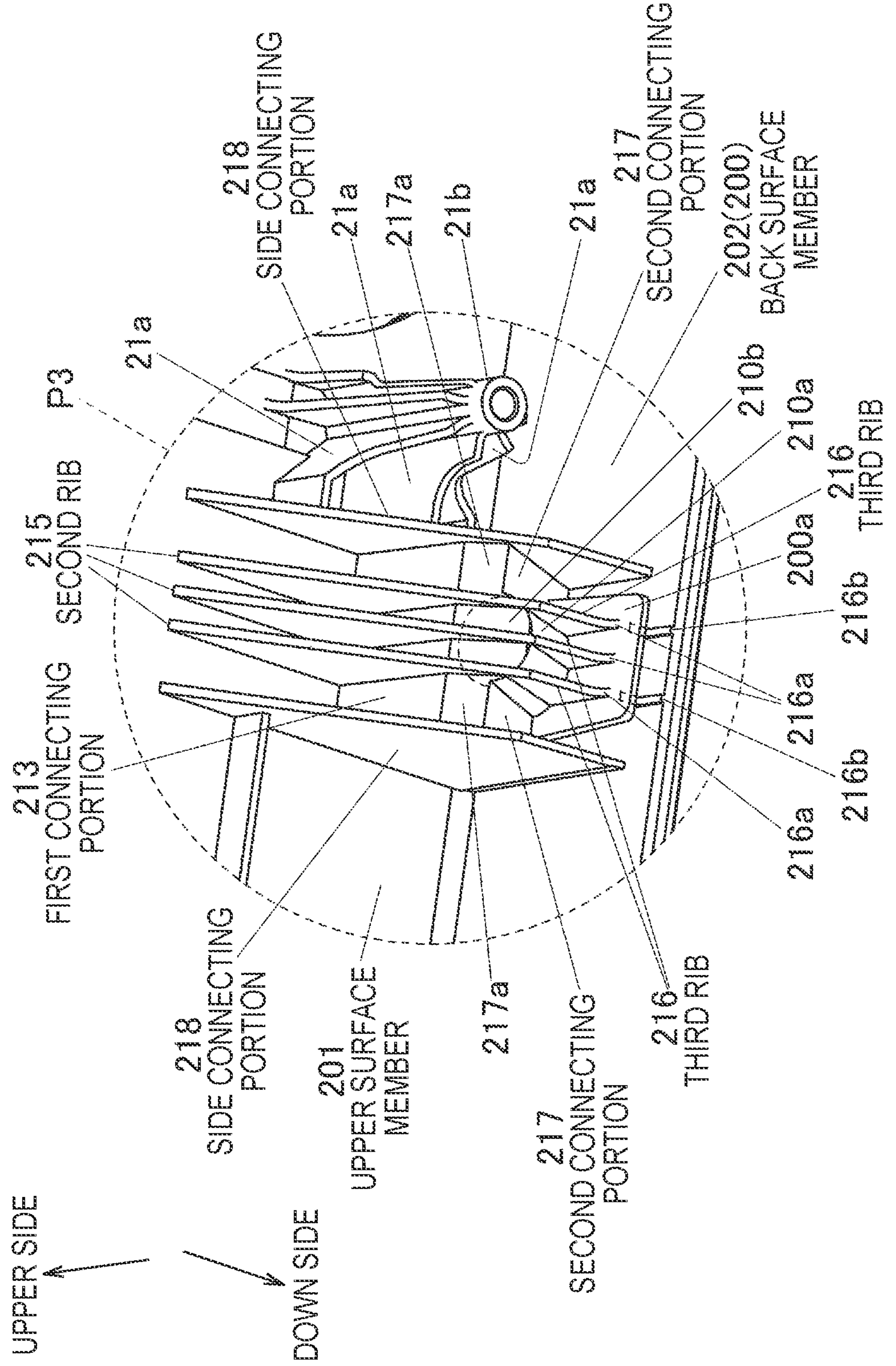
FIG. 5 is a perspective view illustrating a main part of the upper case of the keyboard instrument according to the embodiment of the present invention as viewed from a P33 direction of FIG. 3.

As illustrated in FIGS. 3 and 5, a fitting portion 200*a* having a plate shape which is parallel to the back surface member 202 is provided on the lower side Lo of the holding portion 210 (that is, the lower side Lo of the recessed portion 212). The fitting portion 200*a* has a width slightly larger than the width in the left-right direction of three third ribs 216 arranged as described later. When the upper case 21 and the lower case 22 are combined, the fitting portion 200*a* is fitted to the back surface member 203 of the lower case 22 via a seal member 208 illustrated in FIG. 3 between the back surface member 202 and the fitting portion 200*a*. The third ribs 216 are provided on the lower side Lo of the recessed portion 212.

Among the above-described three third ribs 216, the central third rib 216 is provided so as to connect the lower side Lo of the cylindrical portion 210*a* of the holding portion 210 and the surface of the front side F of the fitting portion 200*a*. Each of the left and right third ribs 216 is connected to the back surface member 202 via the fitting portion 200*a*, and is connected to a rib-shaped guide rib 216*b* extending downward and having a low height. The guide rib 216*b* guides the seal member 208 when the upper case 21 and the lower case 22 are assembled.

The connecting portion 216*a* where each of the third ribs 216 is connected to the fitting portion 200*a* is connected in a concave curved shape. Each of the third ribs 216 has a substantially triangular shape in the side view of FIG. 3. The positions of the three third ribs 216 in the left-right direction are the same as those of the three first ribs 214 and the three second ribs 215.

Figure 4A:
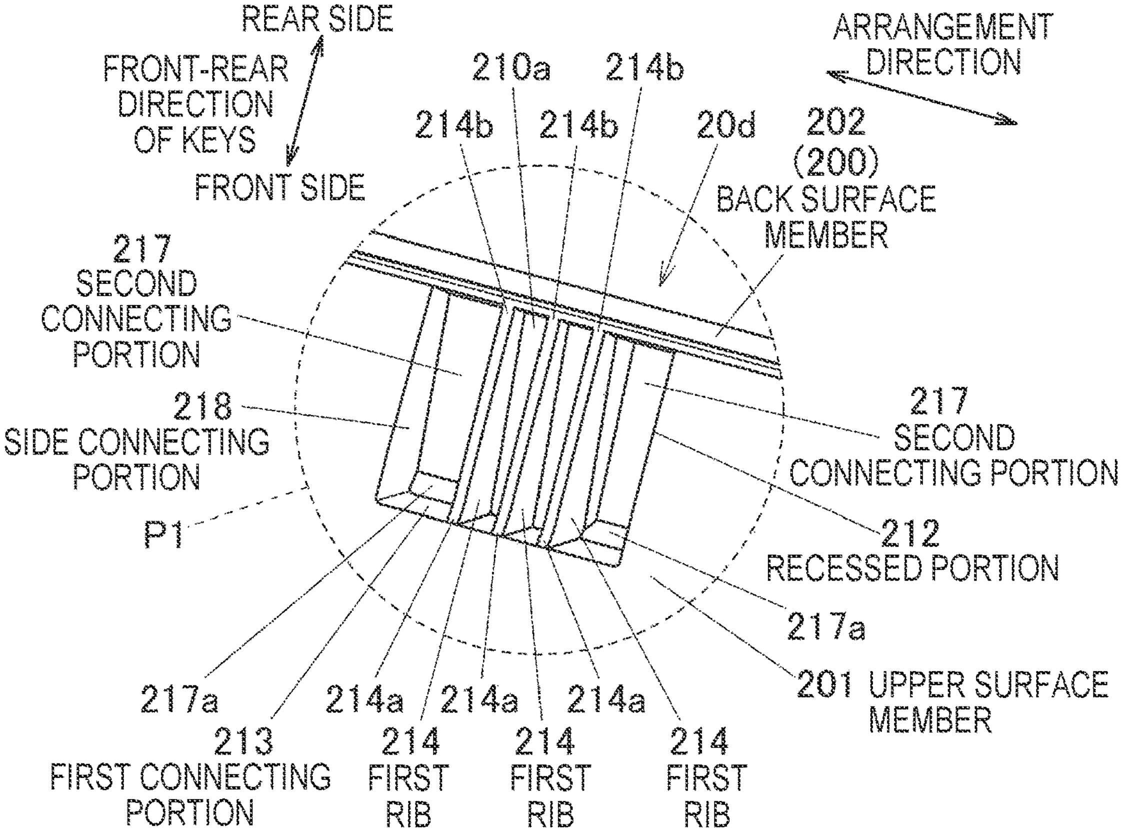
Figure 6:
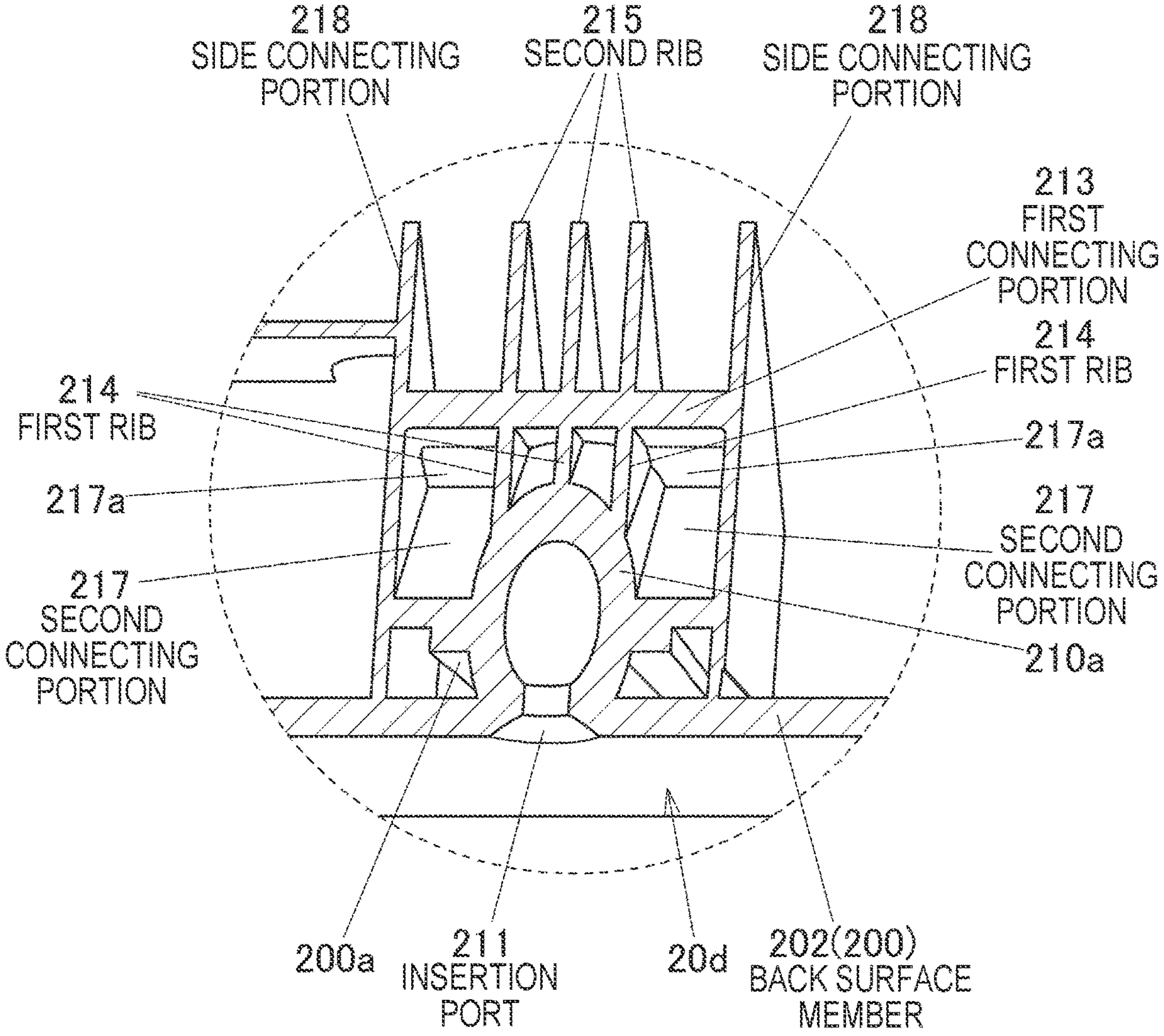
FIG. 6 is a cross-sectional view taken along the line VI-VI of FIG. 3 in the upper case of the keyboard instrument according to the embodiment of the present invention.

As illustrated in FIGS. 4A, 5, and 6, second connecting portions 217 extend from the side surfaces of the cylindrical portion 210*a* of the holding portion 210 in the left-right direction on the left and right sides, respectively. Each of the second connecting portions 217 has a plate shape with the flat portion facing substantially the up-down direction UL. Each of the second connecting portions 217 is provided so as to be inclined similarly to the cylindrical portion 210*a* of the holding portion 210. Each of the second connecting portions 217 is provided with a bent portion 217*a* following the bottom portion 210*b* at a position corresponding to the bottom portion 210*b* of the holding portion 210. The bent portion 217*a* is connected to the lower end of the first connecting portion 213.

Side connecting portions 218 having a plate shape are provided at left and right ends of the first connecting portion 213 and the second connecting portions 217, respectively. The side connecting portions 218 connect left and right ends of the first connecting portion 213 and the second connecting portions 217, the surface of the lower side Lo of the upper surface member 201, and the surface of the front side F of the back surface member 202. The side connecting portions 218 have a substantially triangular shape in the side view of FIG. 3. As illustrated in FIG. 5, the side connecting portion 218 in the recessed portion 212 is connected to a plurality of ribs 21*a* from the outside. Here, the ribs 21*a* are reinforcing members for reinforcing a boss-shaped fixing member 21*b* into which a bolt (not illustrated) for fixing the upper case 21 and the lower case 22 to each other is inserted and screwed inside the upper case 21. In this manner, the case 20 (upper case 21) includes the fixing members 21*b* each having the plurality of ribs 21*a* connected to the side connecting portion 218 from the outside.

Figure 4B:
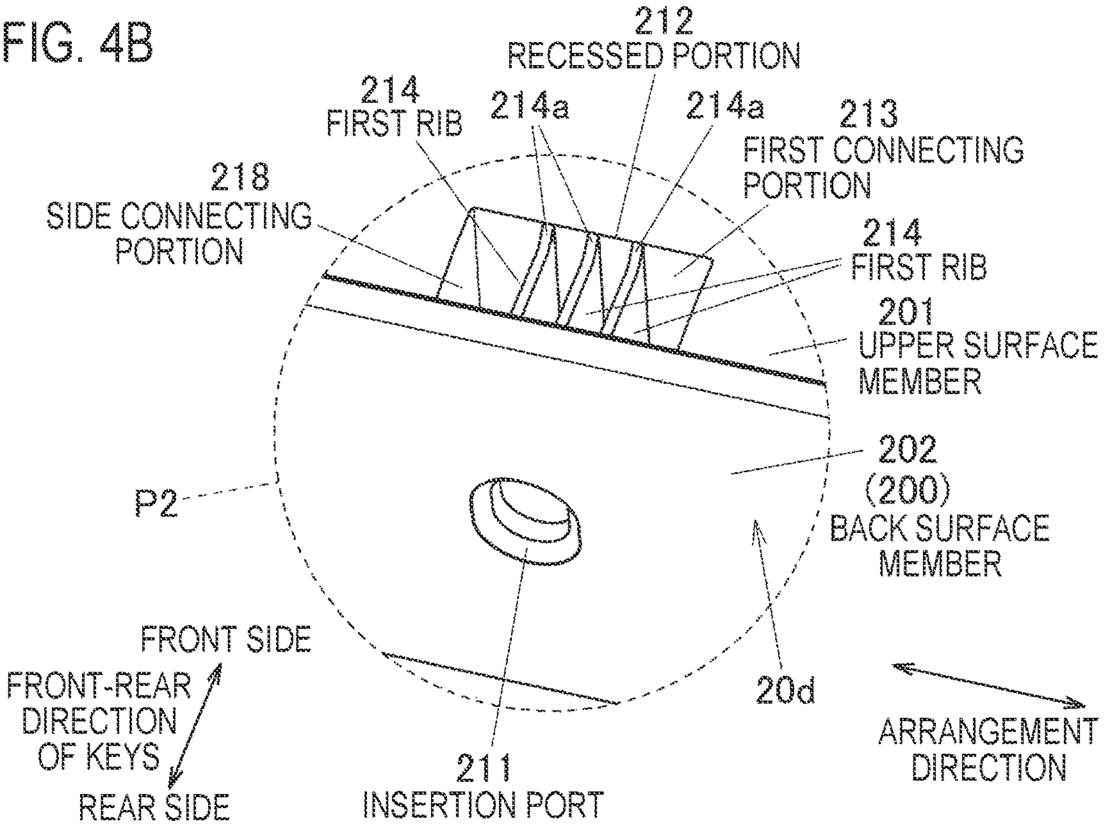

As illustrated in FIGS. 4A, 4B, and 6, the opening edge of the recessed portion 212 includes the edge portions of the side connecting portions 218 facing each other, and the edge portion of the first connecting portion 213. The inside of the recessed portion 212 is closed by the side connecting portions 218, the first connecting portion 213, the holding portion 210, and the second connecting portions 217 except for the portion opened to the upper surface.

In this manner, the holding portion 210 is firmly supported by the first ribs 214, the second ribs 215, and the third ribs 216 as reinforcing members. Therefore, even if the insertion portions 53*a* and 53*b* are inserted into the insertion ports 211 to attach the music stand 50 to the case 20, and the music stand 50 is pushed to tilt toward the rear side B, damage such as detachment of the holding portions 210 from the case 20 (upper case 21) is reduced.

Furthermore, since the holding portions 210 that hold the music stand 50 can be integrally formed with the upper case 21 by resin molding, the number of manufacturing steps can be reduced as compared with a case where the holding portions 210 are assembled to the upper case 21 as separate components. Since the space is provided inside the recessed portion 212, molding defects such as sink marks are reduced in the upper case 21 manufactured by resin injection molding. In addition, the exterior member 5 such as the console unit 12 and the sound emission units 13*a* and 13*b* is disposed on the upper side Up of the upper surface members 201 and covers the recessed portions 212. As a result, the recessed portions 212, and the first ribs 214 and the like inside the recessed portions 212 are not visible from the outside.

As described above, according to the embodiment of the present invention, the keyboard instrument 10 includes the case 20 (upper case 21) including the back surface member 202 having the insertion ports 211 into which the music stand 50 is inserted, and the upper surface member 201 having the recessed portions 212 provided corresponding to the insertion ports 211, and the exterior member 5 that is disposed on the upper side of the upper surface member 201 and covers the recessed portions 212.

As a result, even if a force is applied to the music stand 50, the recessed portions 212 reliably support the music stand 50. Since the recessed portions 212 are covered with the exterior member 5, the keyboard instrument 10 can have high designability.

In addition, the first ribs 214 as reinforcing members are provided inside the recessed portion 212. As a result, even if an operation of inserting the music stand 50 into the insertion ports 211 and, for example, creasing the music placed on the music stand 50 is performed, and a force of causing the bottom portions 210*b* of the holding portions 210 to be directed upward is applied to the holding portions 210, the music stand 50 can be reliably supported.

The shape of the recessed portion 212 includes a quadrangular frustum shape, and the shape of the first ribs 214 includes a substantially trapezoidal shape. As a result, the first ribs 214 can be disposed in the recessed portion 212 in a satisfactory manner.

The length of the recessed portion 212 in the up-down direction is larger on the front side F in the front-rear direction FB of the keys than on the rear side B, and the length of the recessed portion 212 in the arrangement direction LR of the keys is larger than the length of the insertion port 211 in the arrangement direction LR of the keys. Thus, the recessed portions 212 are provided corresponding to the insertion ports 211, and the music stand 50 can be reliably supported.

Further, the case 20 (upper case 21) includes the second ribs 215 connected to the recessed portion 212 on the outside and the front side F of the recessed portion 212. As a result, the recessed portions 212 can be reinforced and supported particularly with respect to the music stand 50 tilted to the rear side B.

Further, the case 20 (upper case 21) includes the fixing members 21*b* each having the ribs 21*a* connected from the outside to the side connecting portion 218 in the recessed portion 212. As a result, the recessed portion 212 is further reinforced.

Further, the case 20 (upper case 21) includes the fitting portions 200*a* each provided on the lower side Lo of the recessed portion 212 and fitted to the lower case 22, and the third ribs 216 provided on the lower side Lo of the insertion port 211 and connected to the fitting portion 200*a*. As a result, the upper case 21 and the lower case 22 can be fitted to each other, and can be easily fixed with bolts or the like.

In addition, the exterior member 5 includes at least one of the console unit 12 that receives an input operation and the sound emission units 13*a* and 13*b* that emit sound from the speakers 13*a*1 and 13*b*1. As a result, a plurality of exterior members 5 can be recombined to make a large number of product variations.

Although some embodiments of the present invention have been described, these embodiments have been presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the equivalent scope thereof.

What is claimed is:

1. A keyboard instrument including:

a case including:

a back surface member having an insertion port into which a music stand is insertable;

a cylindrical portion integrally formed with the case and configured to receive a portion of the music stand therein;

an upper surface member in which a recessed portion is provided at a position corresponding to a position of the cylindrical portion; and a fixing member having a rib connected from an outside of the recessed portion to a side connecting portion of the recessed portion; and an exterior member that is disposed at a position above an upper side of the upper surface member, and that covers the recessed portion, wherein an opening of the insertion port is coplanar with an outer surface of the back surface member.

2. The keyboard instrument according to claim 1, wherein a second rib as a reinforcing member is provided inside the recessed portion.

3. The keyboard instrument according to claim 2, wherein:

the recessed portion has a quadrangular frustum shape, and the second rib has a substantially trapezoidal shape in section.

4. The keyboard instrument according to claim 1, wherein:

a length of the recessed portion in an up-down direction is larger on a front side in a front-rear direction of keys of the keyboard instrument than on a rear side, and a length of the recessed portion in an arrangement direction of the keys is larger than a length of the insertion port in the arrangement direction of the keys.

5. The keyboard instrument according to claim 1, wherein the case further includes a second rib connected to the recessed portion on an outer front side of the recessed portion.

6. The keyboard instrument according to claim 1, wherein the case further includes:

a fitting portion provided on a lower side of the recessed portion and fitted to a lower case; and a second rib provided on a lower side of the insertion port and connected to the fitting portion.

7. The keyboard instrument according to claim 1, wherein the exterior member includes at least one of a console unit that receives an input operation and a sound emission unit that emits sound from a speaker.

8. The keyboard instrument according to claim 1, wherein:

the insertion port comprises an opening of the cylindrical portion, and the cylindrical portion is configured to receive and hold an insertion portion of the music stand therein.

9. The keyboard instrument according to claim 8, wherein the cylindrical portion extends towards a front of the case with respect to the back surface member.

10. A keyboard instrument including:

a case including a back surface member having an insertion port into which a music stand is insertable, and an upper surface member having a recessed portion provided at a position corresponding to the insertion port; and an exterior member that is disposed on an upper side of the upper surface member and that covers the recessed portion, wherein the case includes:

a fitting portion provided on a lower side of the recessed portion and fitted to a lower case; and a rib provided on a lower side of the insertion port and connected to the fitting portion.

* * * * *